United States Patent [19]
Rink et al.

[11] Patent Number: 6,145,877
[45] Date of Patent: Nov. 14, 2000

[54] PRESSURE VESSEL INFLATOR HAVING A PREFORMED OPENING FEATURE

[75] Inventors: Karl K. Rink, Liberty; David J. Green, Brigham City; Bradley D. Harris, Farmington, all of Utah; Darrin L. Johnson, Fountain Hills, Ariz.

[73] Assignee: Autoliv ASP, Inc., Ogden, Utah

[21] Appl. No.: 09/087,164

[22] Filed: May 29, 1998

[51] Int. Cl.⁷ .................................................. B60R 21/26
[52] U.S. Cl. ........................................... 280/737; 280/741
[58] Field of Search ................................ 280/730.2, 736, 280/737, 741

[56] References Cited

U.S. PATENT DOCUMENTS

| | | |
|---|---|---|
| 3,460,853 | 8/1969 | Chute . |
| 3,708,181 | 1/1973 | Mazelsky . |
| 3,817,263 | 6/1974 | Bendler et al. . |
| 3,836,170 | 9/1974 | Grosch et al. . |
| 3,869,143 | 3/1975 | Merrell . |
| 4,938,501 | 7/1990 | Wipasuramonton . |
| 5,346,251 | 9/1994 | Burnard et al. . |
| 5,411,290 | 5/1995 | Chan et al. . |
| 5,415,845 | 5/1995 | Brede et al. . |
| 5,470,104 | 11/1995 | Smith et al. . |
| 5,494,312 | 2/1996 | Rink . |
| 5,516,144 | 5/1996 | Headley et al. . |
| 5,531,473 | 7/1996 | Rink et al. . |
| 5,551,725 | 9/1996 | Ludwig . |
| 5,669,629 | 9/1997 | Rink . |

FOREIGN PATENT DOCUMENTS 2 120 277   11/1972   Germany .

Primary Examiner—Paul N. Dickson
Assistant Examiner—Faye M. Fleming
Attorney, Agent, or Firm—Sally J. Brown

[57] ABSTRACT

An apparatus for inflating an inflatable device, which apparatus includes a pressure vessel having a preformed opening feature and a method of fabricating a corresponding single chamber apparatus for inflating an inflatable device.

16 Claims, 8 Drawing Sheets

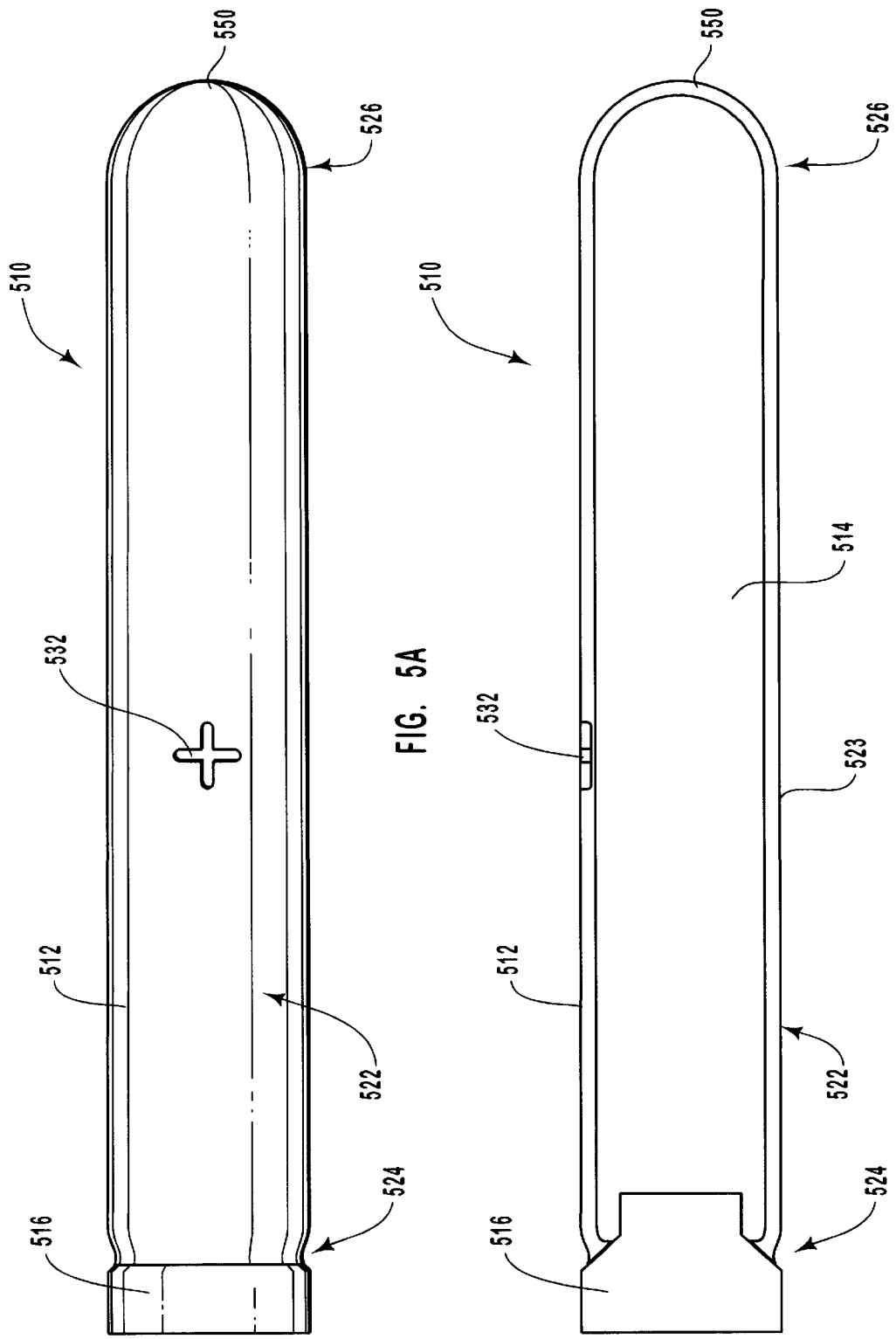

PRESSURE VESSEL INFLATOR HAVING A PREFORMED OPENING FEATURE

CROSS REFERENCE TO RELATED APPLICATIONS

The subject matter of this application is related to prior U.S. patent applications Ser. Nos. 08/935,014 and 08/935,016, each respectively filed on Sep. 22, 1997 as a continuation-in-part application of application U.S. Ser. No. 08/632,698, filed on Apr. 15, 1996, now Rink, U.S. Pat. No. 5,669,629, issued Sep. 23, 1997, and U.S. Ser. No. 09/005,274, filed on Jan. 9, 1998. The subject matter of this application is also related to prior U.S. patent application Ser. No. 09/027,020, filed on Feb. 20, 1998. The disclosures of each and every of these prior applications are hereby incorporated by reference herein and made a part hereof, including but not limited to those portions which specifically appear hereinafter.

BACKGROUND OF THE INVENTION

This invention relates generally to pressurized fluid-containing apparatuses and devices and, more particularly, to such an apparatus or device used in the inflation of an inflatable device such as an inflatable vehicle occupant restraint airbag cushion used in inflatable restraint systems.

It is well known to protect a vehicle occupant using a cushion or bag, e.g., an "airbag cushion," that is inflated or expanded with gas when the vehicle encounters sudden deceleration, such as in a collision. In such systems, the airbag cushion is normally housed in an uninflated and folded condition to minimize space requirements. Upon actuation of the system, the cushion begins to be inflated, in a matter of no more than a few milliseconds, with gas produced or supplied by a device commonly referred to as "an inflator."

Many types of inflator devices have been disclosed in the art for the inflating of one or more inflatable restraint system airbag cushions. Prior art inflator devices include compressed stored gas inflators, pyrotechnic inflators and hybrid inflators. Unfortunately, each of these types of inflator devices has been subject to certain disadvantages such as greater than desired weight and space requirements, production of undesired or non-preferred combustion products in greater than desired amounts, and production or emission of gases at a greater than desired temperature, for example.

In view of these and other related or similar problems and shortcomings of prior inflator devices, a new type of inflator, called a "fluid fueled inflator," has been developed. Such inflators are the subject of commonly assigned Smith et al., U.S. Pat. No. 5,470,104, issued Nov. 28, 1995; Rink, U.S. Pat. No. 5,494,312, issued Feb. 27, 1996; and Rink et al., U.S. Pat. No. 5,531,473, issued Jul. 2, 1996, the disclosures of which are fully incorporated herein by reference.

Such inflator devices typically utilize a fuel material in the form of a fluid, e.g., in the form of a gas, liquid, finely divided solid, or one or more combinations thereof, in the formation of an inflation gas for an airbag. In one such inflator device, the fluid fuel material is burned to produce gas which contacts a quantity of stored pressurized gas to produce inflation gas for use in inflating a respective inflatable device.

While such an inflator can successfully overcome, at least in part, some of the problems commonly associated with the above-identified prior types of inflator devices, there is a continuing need and demand for further improvements in safety, simplicity, effectiveness, economy and reliability in the apparatus and techniques used for inflating an inflatable device such as an airbag cushion.

To that end, the above-identified Rink, U.S. Pat. No. 5,669,629 discloses a new type of inflator wherein a gas source material undergoes decomposition to form decomposition products including at least one gaseous decomposition product used to inflate an inflatable device.

Such an inflator can be helpful in one or more of the following respects: reduction or minimization of concerns regarding the handling of content materials; production of relatively low temperature, non-harmful inflation gases; reduction or minimization of size and space requirements and avoidance or minimization of the risks or dangers of the gas producing or forming materials undergoing degradation (thermal or otherwise) over time as the inflator awaits activation.

Nevertheless, there is a need and demand for yet still further improvements in safety, simplicity, effectiveness, economy and reliability in the apparatus and techniques used for inflating an inflatable device such as an airbag cushion.

For example, it is common in prior inflator devices to have one or more preformed openings or passages with each such opening or passage normally covered or blocked by a device, such as a burst disc or the like, until such time as when flow through the opening or passage is desired. As a result of the use of a separate covering or blocking device, the number of component parts may be greater than desired for optimal handling and manufacture and the risks associated with the formation of leak paths from an inflator device pressure vessel may be greater than desired. In addition, current inflator assembly designs commonly weld such burst discs or the like in place. Unfortunately, welding can be a relatively expensive manufacturing process. For proper welding, the surface conditions of the components to be joined must usually be well controlled in terms of geometric tolerances and surface cleanliness. Further, the equipment needed or used in such weld processing can be expensive to purchase and maintain. Still further, weld processing is typically a source of high scrap rates in high volume production programs.

Consequently, there is a need and a demand for still further reductions in the number of inflator component parts such as through the elimination of a burst disc or the like and for inflator assemblies which can simplify manufacture and avoid or minimize the risks of possibly forming leak paths from the pressure vessel. In particular, there is a need and demand for an improved inflator apparatus such as may be helpful in either or both reducing or simplifying the number or types of component parts and manufacturing process steps. Further, there is a need and demand for an improved pressurized inflator apparatus which reduces or minimizes the possible number of leak paths and thus may result in improved reliability and simplified manufacture and production.

SUMMARY OF THE INVENTION

A general object of the invention is to provide an improved apparatus for inflating an inflatable device such as an inflatable vehicle occupant restraint such as used in vehicular inflatable restraint systems.

A more specific objective of the invention is to overcome one or more of the problems described above.

The general object of the invention can be attained, at least in part, through an apparatus for inflating an inflatable device, which apparatus includes a unitary pressure vessel wall having, at a selected location, at least one preformed pressure vessel opening feature whereat the unitary wall preferentially opens upon application of sufficient pressure thereagainst.

The prior art fails to provide an inflator apparatus wherein the number or types of component parts and manufacturing process steps have either or both been reduced or simplified to as great an extent as may be desired. The prior art further fails to provide a pressurized inflator apparatus which reduces or minimizes the possible number of leak paths and thus can result in further improved reliability and simplified manufacture and production.

The invention further comprehends a side impact inflatable device inflator which inflator includes a pressure chamber and an initiator device. The pressure chamber is formed at least in part by an elongated, generally cylindrical unitary pressure vessel wall. The unitary pressure vessel wall includes an open axial end and, at a selected location, at least one preformed pressure vessel opening feature whereat the wall preferentially opens upon application of sufficient pressure thereagainst. The pressure chamber contains contents including a quantity of nitrous oxide which, upon actuation, undergoes dissociation to form dissociation products including at least one gaseous dissociation product used to inflate the side impact inflatable device. The initiator device is fixed to the open axial end of the unitary pressure vessel wall. The initiator device is actuatable to be in dissociation initiating relationship with at least a portion of the quantity of nitrous oxide contained within the pressure chamber.

The invention still further comprehends a method of fabricating a single chamber apparatus for inflating an inflatable device. The method includes the step of providing an intermediate part which includes a bulkhead and which bulkhead contains at least one preformed pressure vessel opening feature. The part also includes first and second oppositely disposed tubular extensions of respective first and second lengths extending from the bulkhead with the first and second tubular extensions each having an open end. The method also includes the step of securing an initiator device to the open end of the first tubular extension to form a closed pressure vessel chamber. The closed pressure vessel chamber contains contents including a quantity of at least one gas source material which undergoes dissociation to form dissociation products including at least one gaseous dissociation product used to inflate the device. The method further includes the step of securing a diffuser member to the open end of the second tubular extension.

As used herein, references to "dissociation," "dissociation reactions" and the like are to be understood to refer to the dissociation, splitting, decomposition or fragmentation of a single molecular species into two or more entities.

"Thermal dissociation" is a dissociation controlled primarily by temperature. It will be appreciated that while pressure may, in a complex manner, also influence a thermal dissociation such as perhaps by changing the threshold temperature required for the dissociation reaction to initiate or, for example, at a higher operating pressure change the energy which may be required for the dissociation reaction to be completed, such dissociation reactions remain primarily temperature controlled.

An "exothermic thermal dissociation" is a thermal dissociation which liberates heat.

"Equivalence ratio" ($\phi$) is an expression commonly used in reference to combustion and combustion-related processes. Equivalence ratio is defined as the ratio of the actual fuel to oxidant ratio $(F/O)_A$ divided by the stoichiometric fuel to oxidant ratio $(F/O)_S$:

$$\phi=(F/O)_A/(F/O)_S \tag{1}$$

(A stoichiometric reaction is a unique reaction defined as one in which all the reactants are consumed and converted to products in their most stable form. For example, in the combustion of a hydrocarbon fuel with oxygen, a stoichiometric reaction is one in which the reactants are entirely consumed and converted to products entirely constituting carbon dioxide ($CO_2$) and water vapor ($H_2O$). Conversely, a reaction involving identical reactants is not stoichiometric if any carbon monoxide (CO) is present in the products because CO may react with $O_2$ to form $CO_2$, which is considered a more stable product than CO.)

For given temperature and pressure conditions, fuel and oxidant mixtures are flammable over only a specific range of equivalence ratios. Mixtures with an equivalence ratio of less than 0.25 are herein considered nonflammable, with the associated reaction being a decomposition reaction or, more specifically, a dissociative reaction, as opposed to a combustion reaction.

Other objects and advantages will be apparent to those skilled in the art from the following detailed description taken in conjunction with the appended claims and drawings.

BRIEF DESCRIPTION OF THE DRAWINGS

FIG. 5A is a simplified, top plan view of an airbag inflator in accordance with another embodiment of the invention.

FIG. 5B is a simplified, partially in section, side view schematic drawing of the airbag inflator of FIG. 5A.

DETAILED DESCRIPTION OF THE INVENTION

Figure 1:
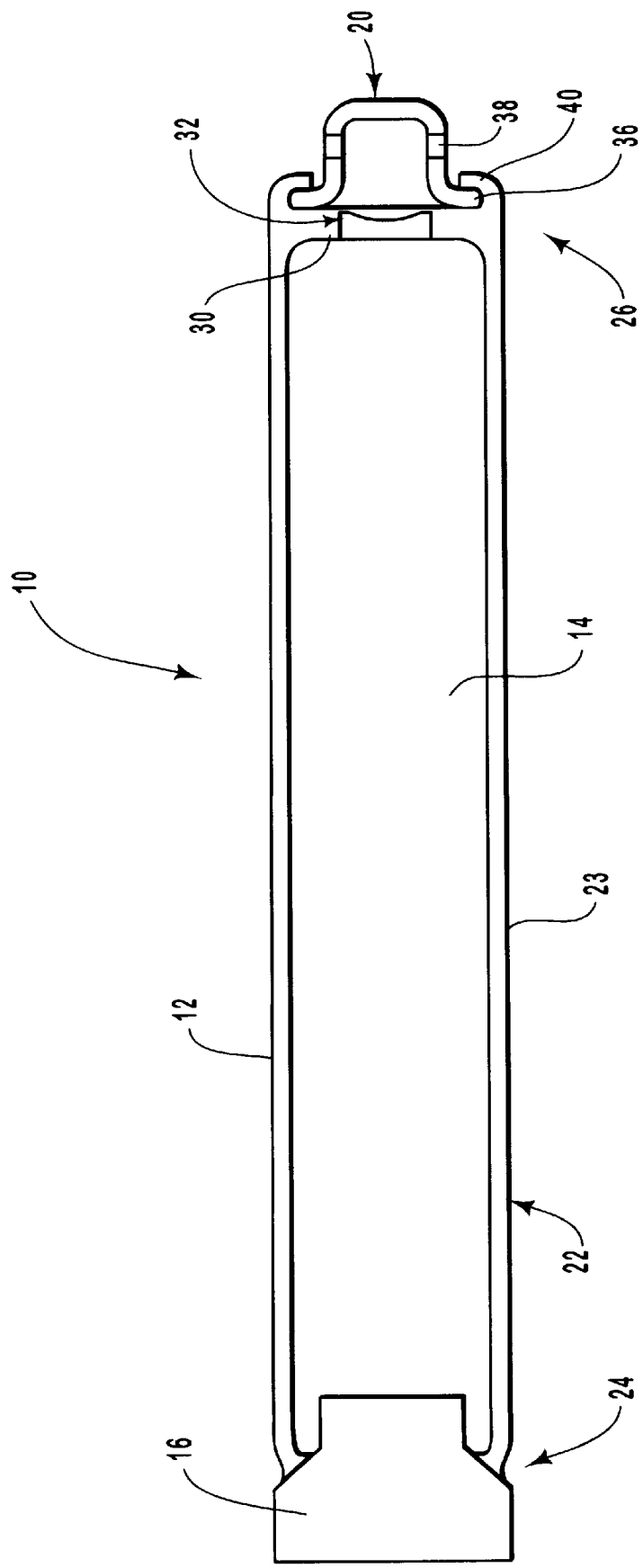
FIG. 1 is a simplified, partially in section, schematic drawing of an airbag inflator in accordance with one embodiment of the invention.

The present invention may be embodied in a variety of different structures. Referring initially to FIG. 1, there is illustrated an airbag inflator assembly, generally designated by the reference numeral 10, in accordance with one preferred embodiment of the invention and such as may be used to inflate an inflatable vehicle occupant restraint, e.g., an inflatable airbag cushion, (not shown). As is known and upon proper actuation, such inflatable vehicle occupant restraints are typically inflated by a flow of an inflation fluid, e.g., gas, from an inflator assembly to restrain movement of an occupant of the vehicle. In practice, it is common that the inflatable vehicle occupant restraints be designed to inflate into a location within the vehicle between the occupant and certain parts of the vehicle interior, such as the doors, steering wheel, instrument panel or the like, to prevent or avoid the occupant from forcibly striking such parts of the vehicle interior.

While the invention is described hereinafter with particular reference to an inflator for side impact airbag assemblies in various automotive vehicles including vans, pick-up trucks, and particularly automobiles, it is to be understood that the invention also has applicability not only with other types or kinds of airbag installations for automotive vehicles including driver side and passenger side airbag assemblies, but also with other types of vehicles including, for example, airplanes.

With respect to such automotive vehicles it will be appreciated from the following discussion that the invention is perceived to have the most particular utility, at least initially, in side impact airbag assemblies wherein the rate of gas release from the inflator device into the associated airbag cushion is generally not as specifically or finely controlled as in driver or passenger side airbag assemblies, for example.

The inflator assembly 10 comprises a pressure vessel 12 forming a chamber 14, an initiator device 16 and a diffuser member 20.

As will be described in greater detail below, the chamber 14 of the inflator assembly 10, in accordance with one preferred embodiment of the invention, contains a gas source material. As disclosed in above-identified Rink, U.S. Pat. No. 5,669,629, there are various gas source materials which, under specified conditions, undergo reaction variously termed decomposition or dissociation reactions to form products including at least one gaseous product such as may be used to inflate an associated vehicle occupant restraint. Thus, the chamber 14 is sometimes referred to herein as a "dissociation chamber."

The chamber 14 is defined at least in part by an elongated generally cylindrical unitary sleeve 22, having the form of an elongated cylindrical wall 23 with first and second ends, 24 and 26, respectively. The sleeve first end 24 is closed as the end 24 is joined in sealing relationship with the initiator device 16. The sleeve second end 26 is closed by means of a bulkhead 30. As shown in FIG. 1 and in accordance with one preferred embodiment of the invention, the unitary pressure vessel wall 22 includes, as will be described in greater detail below, at least one preformed pressure vessel opening feature 32 whereat the unitary pressure vessel wall 22 preferentially opens upon application of sufficient pressure thereagainst. Specifically, the preformed pressure vessel opening feature 32 of the inflator assembly 10 is situated along or at the bulkhead 30.

The diffuser member 20 includes a flange edge portion 36, such as may be useful to facilitate attachment or securement thereof in the inflator assembly, and a plurality of openings 38 for dispensing inflation gas from the inflator assembly 10 into the associated airbag cushion. In accordance with one preferred embodiment of the invention and as illustrated in FIG. 1, the diffuser member 20 is externally joined adjacent to the pressure vessel 12 adjacent to the preformed pressure vessel opening feature 32. In the illustrated embodiment and as will be described in greater detail below, a tubular extension 40 from the bulkhead 30 is roll crimped about the diffuser flange edge portion 36 to effect such joinder. As will be appreciated by those skilled in the art, the diffuser member can alternatively be joined to or attached with or to an inflator assembly in accordance with the broader teachings of the subject invention. For example, a diffuser member can simply be welded, joined by fasteners or otherwise adhered or fixed to the bulkhead, if desired.

As identified above, the inflator assembly 10 generates inflation gas via a decomposing material or, more specifically, a dissociative material. As disclosed in Rink, U.S. Pat. No. 5,669,629, a wide variety of gas source materials which undergo dissociative or decompositional reactions, preferably an exothermic such reaction, to form gaseous products are available. Such gas source materials include:

acetylene(s) and acetylene-based materials such as acetylene and methyl acetylene, as well as mixtures of such acetylene(s) and acetylene-based materials with inert gas(es);

hydrazines such as hydrazine ($N_2H_4$), mixtures of hydrazine(s) and water, methyl derivatives of hydrazine, as well as mixtures of such hydrazine materials with inert gas(es);

peroxides and peroxide derivatives such as methyl hyperoxide ($CH_3OOH$) and mixtures of methyl hyperoxide and methanol, hydrogen peroxide, alkyl hydroperoxides, propionyl and butyryl peroxides, as well as mixtures of such peroxides and peroxide derivatives with inert gas(es); and nitrous oxide ($N_2O$) and mixtures of nitrous oxide with inert gas(es), for example.

Generally, dissociative gas source materials used in the practice of the invention are preferably:

a.) non-toxic and non-corrosive both in the pre- and post-dissociation states;

b.) relatively stable at atmospheric conditions thus permitting and facilitating storage in a liquid phase, where a liquid, as compared to a gas, permits the storage of a greater amount of material in the same volume at a given pressure;

c.) do not require the presence of catalyst(s) to trigger the dissociation reaction, and which catalysts may be difficult to remove or handle; and d.) form products of dissociation which do not contain undesirable levels of undesirable species, such as carbonaceous material (e.g., soot), $CO_x$, $NO_x$, $NH_3$, for example (where x=1 or 2).

A currently preferred dissociative gas source material for use in the practice of the invention is nitrous oxide ($N_2O$). Nitrous oxide is advantageously generally non-toxic and non-corrosive. Further, nitrous oxide, as compared to gases such as air, nitrogen and argon, liquefies relatively easily at ambient temperatures. Additionally, nitrous oxide is relatively inert up to temperatures of about 200° C. or more. As a result, nitrous oxide is desirably relatively safe to handle, thermally stable, facilitates storage, and alleviates manufacturing concerns. Further, in accordance with the chemical reaction (2) identified below, upon the dissociation of nitrous oxide, the dissociation products ideally are nitrogen and oxygen:

$$2N_2O = 2N_2 + O_2 \qquad (2)$$

Thus, not only does such reaction form products which are generally non-toxic and non-corrosive but also results in the production or formation of molecular oxygen, such as may be desired with certain inflator designs.

It is to be understood that such nitrous oxide gas source material can, for example and as desired, be stored in a gaseous, liquid or multi-phase form (i.e., partially gaseous and partially liquid mixture). The premium on size generally placed on modern vehicle design, however, results in a general preference for smaller sized airbag inflators. In view thereof and the fact that the density of nitrous oxide is significantly greater when in a liquid rather than gaseous form, one preferred embodiment of the invention involves storage of nitrous oxide primarily in a liquid form.

It is also to be understood that while such nitrous oxide dissociative gas source material can be contained within the dissociation chamber in a pure form (e.g., such that the chamber contents include no more than minor levels of other materials, such as air as may be present in the dissociative chamber prior to being filled with the dissociative gas source material), it may be preferred to include an inert gas therewith. For example, an inert gas such as helium can be included with nitrous oxide to facilitate leak checking of the inflator apparatus or, more specifically, of the dissociation chamber thereof. Alternatively or in addition, an inert gas, such as argon and helium, for example, or mixture of such inert gases, can be included to supplement the gas produced or formed upon the dissociation of the nitrous oxide.

Additionally or alternatively and as disclosed in the above-identified U.S. patent application Ser. No. 08/935,016, the dissociation chamber 14 may contain a quantity of at least one radioactive isotope leak trace material whereby fluid leakage from the chamber can be detected as disclosed therein.

In addition, the dissociation chamber 14 can, if and as desired, also include a sensitizer material to promote or accelerate the rate of such dissociative reaction. Various sensitizer materials disclosed and identified in above-identified Rink, U.S. Pat. No. 5,669,629. As disclosed therein, sensitizer materials are typically hydrogen-bearing materials. Such sensitizer materials are generally added to the dissociative gas source material in small amounts. Specifically, the sensitizer material is preferably added to the dissociative gas source material in an amount below the flammability limits for the content mix, such that the contents of the dissociative chamber are generally at an equivalence ratio of less than 0.25, preferably less than 0.15. At such low relative amounts, the chamber contents are essentially non-flammable and thus combustion and the formation of combustion products are practically avoided.

Hydrogen-bearing sensitizer materials useable in the practice of the invention are typically gaseous, liquid, solid, or multi-phase combinations thereof including hydrogen, hydrocarbons, hydrocarbon derivatives and cellulosic materials. Preferred hydrocarbon hydrogen-bearing sensitizer materials useable in the practice of the invention include paraffins, olefins, cycloparaffins and alcohols. Molecular hydrogen ($H_2$), which does not result in the formation of carbon oxides such as carbon monoxide or carbon dioxide, has been found to be quite effective as a sensitizer and is an especially preferred hydrogen-bearing sensitizer material for use in the practice of the invention.

To minimize possible leak paths, a cryogenic fill technique, such as disclosed in the above-identified U.S. patent application Ser. No. 08/935,016, may be employed. Alternatively, the dissociation chamber may include a fill port or other appropriate means to permit the introduction of material into the chamber.

In such an assembly, the initiator device can be of any suitable type of initiator means including: bridgewire, spark-discharge, heated or exploding wire or foil, through bulkhead (e.g., an initiator which discharges through a bulkhead such as in the form of a metal hermetic seal), for example, and may, if desired, optionally contain a desired load of a pyrotechnic charge. In practice, however, a relatively large heat input such as from the initiator, may be helpful in obtaining a more thorough initiation of dissociation of various gas source materials, such as nitrous oxide ($N_2O$). In view thereof, as pyrotechnic charge-containing initiators can typically more easily produce such relatively large heat inputs from a relatively small sized initiator device, the practice of the invention with such initiators can be particularly advantageous.

In operation, such as upon the sensing of a collision, an electrical signal is sent to the initiator device 16. The initiator device 16 functions and, when it is a pyrotechnic initiator, discharges high temperature combustion products into the dissociation chamber 14 and the contents thereof, which in a preferred embodiment includes primarily liquid-phase $N_2O$. The large heat addition results in commencement of the exothermic thermal dissociation of the $N_2O$ wherein $N_2O$ begins to breakdown into smaller molecular fragments. As the $N_2O$ molecules fragment, the associated release of energy results in further heating of the remaining chamber contents. Additionally, as the dissociation process proceeds, heating of the contents results in conversion of at least some of the $N_2O$ from a liquid to a gaseous phase. Thus, this dissociation results in not only both the release of heat and the formation of gaseous dissociation products but also an increase in gaseous species due to the conversion of $N_2O$ from a liquid to a gaseous phase. The increase both in temperature and the relative amount of gaseous products within the dissociation chamber 14 results in a rapid pressure rise within the dissociation chamber.

When the gas pressure within the dissociation chamber 14 exceeds the structural capability of the preformed pressure vessel opening feature 32, the preformed pressure vessel opening feature 32 ruptures or otherwise permits the passage of the inflation gas therethrough from the chamber 14 into the diffuser member 20 and subsequently through the diffuser openings 38 and into the associated airbag cushion.

As will be appreciated, the inclusion of a preformed opening feature (or sometimes alternatively referred to as a failure or rupture feature) in the wall of the inflator pressure vessel can provide or result in various advantages. For example, through the inclusion of such a preformed opening feature, the number of component parts required in the assembly can be reduced such as by avoiding the need for a preformed opening or passage which is normally covered or blocked by a device such as through the use of a burst disc or the like until such time as when flow through the opening or passage is desired. Further, such reductions in the number of components such as through the elimination of a burst disc or the like can simplify manufacture and avoid or minimize the risks of possibly forming leak paths from the pressure vessel.

Figure 2:
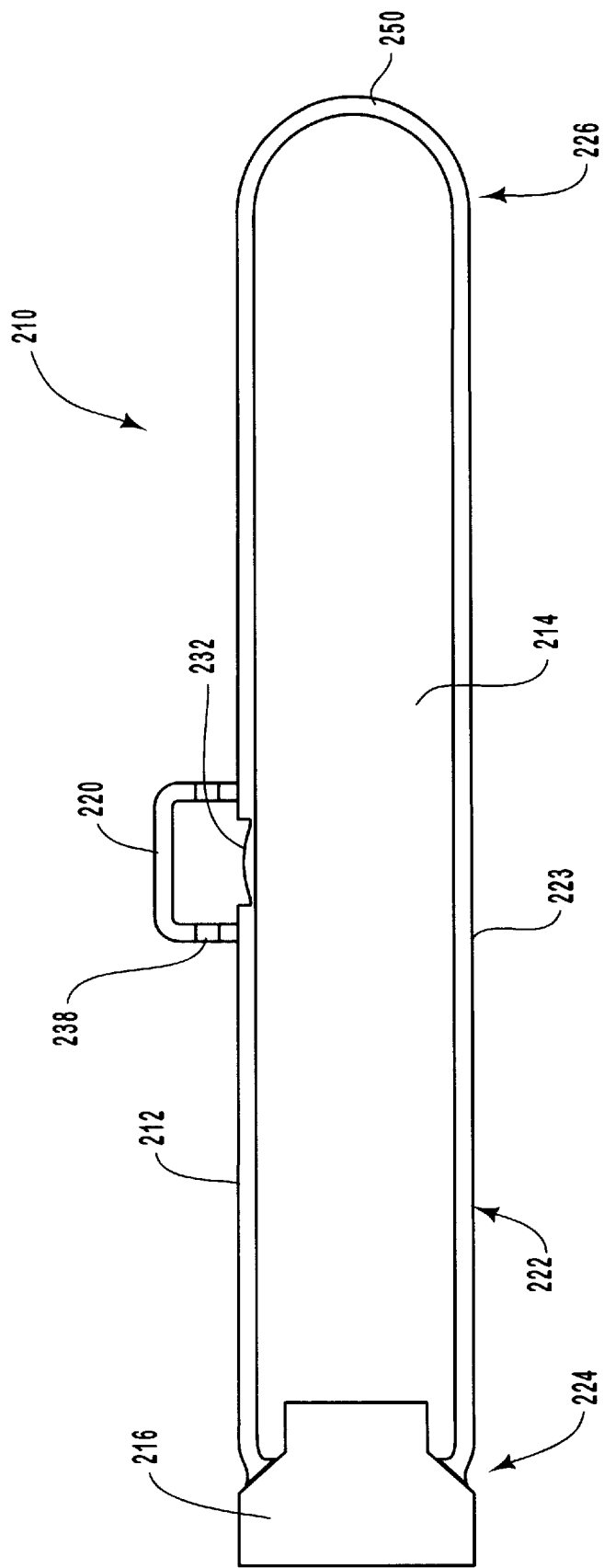
FIG. 2 is a simplified, partially in section, schematic drawing of an airbag inflator in accordance with an alternative embodiment of the invention.

FIG. 2 illustrates an airbag inflator, generally designated by the reference numeral 210, in accordance with an alternative embodiment of the invention. The airbag inflator 210 is generally similar to the airbag inflator 10, described above, and includes a pressure vessel 212 forming a chamber 214 that, as with the chamber 14 described above, contains at least one gas source material, such as $N_2O$, for example.

The inflator assembly 210 also includes an initiator device 216 and a diffuser member 220, having a plurality of openings 238 for dispensing inflation gas from the inflator assembly 210 into the associated airbag cushion (not shown).

The chamber 214, similar to the chamber 14 described above, is defined at least in part by an elongated generally cylindrical unitary wall sleeve 222, having the form of an elongated cylindrical wall 223 with first and second axial ends, 224 and 226, respectively. The sleeve first end 224 is closed as the end 224 is joined in sealing relationship with the initiator device 216. The sleeve second end 226 is closed by means of a rounded end closure 250. As will be appreciated, the incorporation and use of such a rounded end closure can serve to avoid seams or corners that might otherwise lessen or reduce the pressure-containing capability of the associated pressure vessel 212.

The inflator unitary pressure vessel wall 222 includes at least one preformed pressure vessel opening feature 232, whereat the unitary pressure vessel wall 222 preferentially opens upon application of sufficient pressure thereagainst. The preformed pressure vessel opening feature 232 is situated along the elongated cylindrical wall 223 of the sleeve 222. Thus, the preformed pressure vessel opening feature 232 is radially disposed relative to the sleeve open axial end 224 whereat the initiator device 216 is fixed.

The diffuser member 220 is externally disposed relative to the unitary pressure vessel wall 222 about the at least one preformed pressure vessel opening feature 232.

From the above description and the above-identified embodiments, it is to be appreciated that the preformed pressure vessel opening feature of the subject inflator assemblies can generally be located where desired along the inflator unitary pressure vessel wall provided some other inflator assembly component or design aspect does not adversely influence the proper operation of the opening feature. For example, one preferred location for placement of the preformed pressure vessel opening feature is, as shown in FIG. 1, generally directly axially from the associated inflator assembly initiator, in the end wall of the pressure vessel. Another possibly desirable location is shown relative to the embodiment of FIG. 2 wherein the preformed pressure vessel opening feature is placed in the side wall of the pressure vessel.

As will be appreciated, the particular design configuration selected can vary dependent on the particular geometric constraints of a particular inflatable restraint installation.

In addition, the preformed pressure vessel opening feature of the subject inflator assemblies can generally assume various particular forms. In general, the specific geometry of the preformed pressure vessel opening feature will be dependent, at least in part, on one or more selected factors including, for example: material of construction and strength thereof, flow through area required to be provided by the feature, the pressure or other performance characteristic value at which the preformed pressure vessel opening feature is designed to open, and temperature-dependent variations in pressure vessel storage capability.

As will be appreciated, the opening feature selected for use can be uni-directional (e.g., designed to fail or open in only one direction) or bi-directional (e.g., designed to fail or open in either direction).

FIGS. 3(A–E) illustrate fragmentary portions of unitary pressure vessel walls 322(a–e), respectively, each having first and second surfaces 360(a–e) and (362(a–e), respectively. Each fragmentary portions of unitary pressure vessel walls 32(a–e) includes a preformed pressure vessel opening feature 332(a–e), respectively, in accordance with an alternative embodiment of the invention.

FIGS. 3(A–C) illustrate embodiments wherein the opening or rupture of the opening features, 332(a–c), respectively, generally results from a tensile failure of the material forming the respective feature, with failure or opening of the feature generally occurring in a direction of higher pressure to lower pressure. For example, in each of FIGS. 3(A–C), the first surface 360(a–c) generally corresponds to the "high" pressure side while the second surface 362(a–c) generally corresponds to the "low" pressure side, with the respective features 332(a–c) failing or opening in the direction from high to low, e.g., in the direction of the arrows 364(a–c).

Figure 3C:
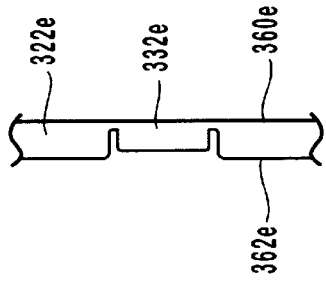
FIGS. 3(A–E) are cross sectional drawings of fragmentary portions of unitary pressure vessel walls each including a preformed pressure vessel opening feature in accordance with an alternative embodiment of the invention.
Figure 3E:
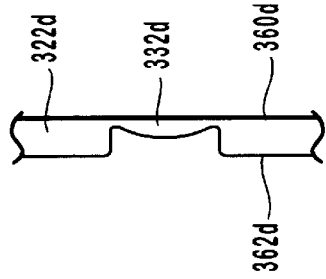
Figure 3B:
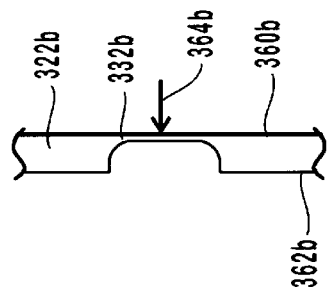
Figure 3D:
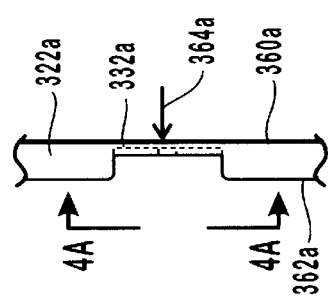
Figure 3A:
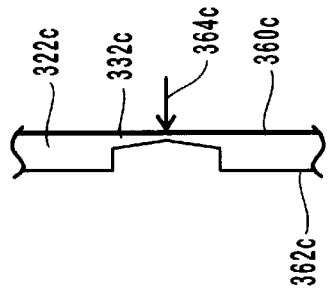
Figure 4A:
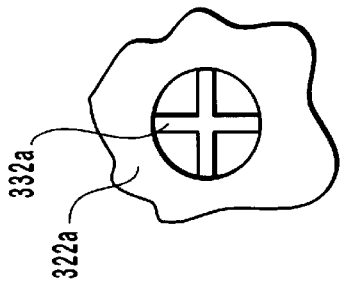
FIG. 4A is a view of the unitary pressure vessel wall fragmentary portion of FIG. 3A taken substantially along the line 4A–4A of FIG. 3A and viewed in the direction of the arrows.

FIG. 4A is a view of the unitary pressure vessel wall fragmentary portion 322a taken substantially along the line 4A—4A of FIG. 3A. As shown, the opening feature 332a has the general shape of form of a cruciform. As will be appreciated, the utilization of such a cruciform opening feature 332a may better ensure or result in a more controlled or uniform performance of the opening feature.

The desired tensile failure, rupture or otherwise opening of the opening features 332(a–c) generally occurs without the undesired formation of separate and distinct vessel chamber fragments. As will be described in greater detail below, at least certain preferred embodiments of the invention utilize such opening features which desirably generally fail, rupture or otherwise open without the undesired formation of separate and distinct vessel chamber fragments.

FIGS. 3D and 3E illustrate embodiments wherein the opening or rupture of the opening features, 332d and 332e, respectively, is in shear such as may result from the application of a sufficient pressure differential between the pressure applied against the respective first and second surfaces. In such embodiments, the opening features are bi-directional and do not have a specifically designated high or low pressure side.

Those skilled in the art will appreciate that many possible opening feature configurations and designs are possible and the invention, in its broader application and practice is not specifically limited to those illustrated and described herein.

It will be appreciated that inflator assemblies in accordance with the invention need not necessarily include an external diffuser member. More specifically, certain inflator applications may not require the gas diffusion action provided by or resulting from such incorporation of a diffuser. For example, in certain side impact inflatable restraint system installations, such as because of the extremely rapid required response, the action of a diffuser may neither be required nor desired.

For example, FIGS. 5A and 5B illustrate one such airbag inflator, generally designated by the reference numeral 510. The airbag inflator 510 is generally similar to the airbag inflator 210, described above, and includes a pressure vessel 512 forming a chamber 514 that, as with the chamber 214 described above, contains at least one gas source material such as $N_2O$, for example. The chamber 514, similar to the chamber 214 described above, is defined at least in part by an elongated generally cylindrical unitary wall sleeve 522, having the form of an elongated cylindrical wall 523 with first and second axial ends, 524 and 526, respectively. The sleeve first end 524 is closed as the end 524 is joined in sealing relationship with an initiator device 516. The sleeve second end 526 is closed by means of a rounded end closure 550.

As with the airbag inflator 210, the airbag inflator 510 includes, situated along the elongated cylindrical wall 523 of the sleeve 522, radially disposed relative to the sleeve open axial end 524 whereat the initiator device 516 is fixed, a preformed pressure vessel opening feature 532, whereat the unitary pressure vessel wall 522 preferentially opens upon application of sufficient pressure thereagainst.

The preformed pressure vessel opening feature 532 is in the form of a cruciform, similar in nature to the opening feature 332a shown in FIGS. 3A and 4A and described above. As identified above, the desired tensile failure, rupture or otherwise opening of such an opening feature generally occurs without the undesired formation of separate and distinct vessel chamber fragments. The avoidance of such fragment formation may be particularly desirable in those airbag installations which do not utilize a diffuser or the like device either as a part of the inflator or the associated housing structure and which diffuser or like device may normally also serve to capture, retain or otherwise prevent the passage of such fragments from the inflator to other system components, e.g., the associated airbag cushion.

Figure 6:
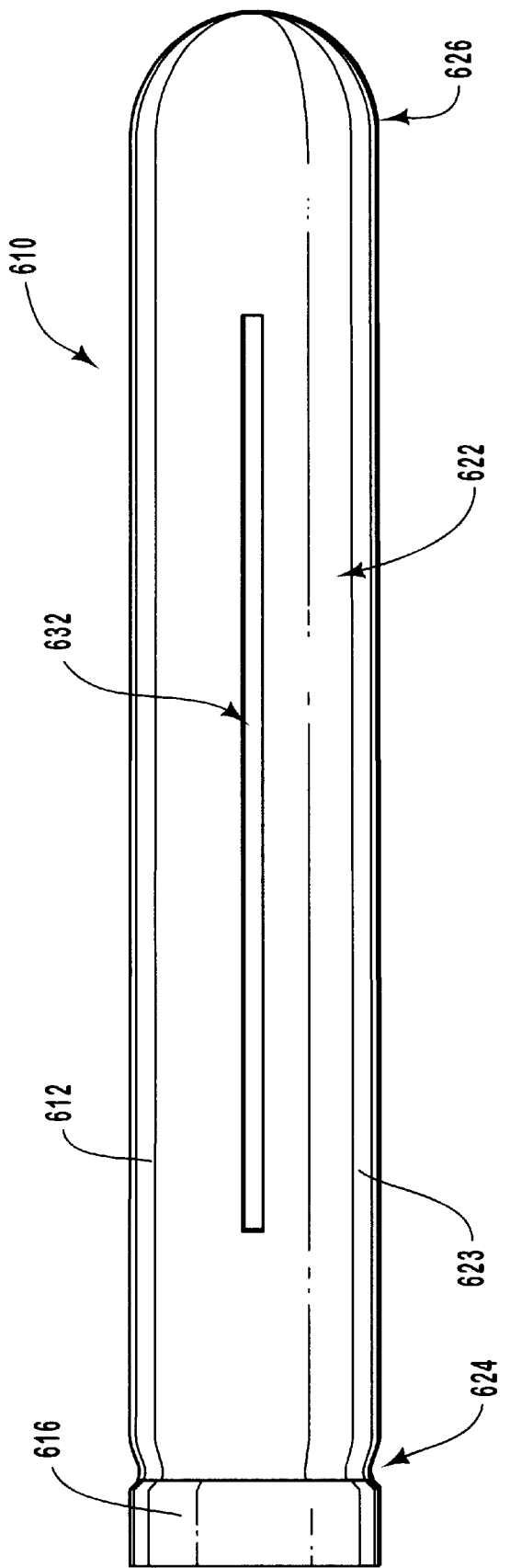
FIG. 6 is a simplified, front view, schematic drawing of an airbag inflator in accordance with another alternative embodiment of the invention.

Turning now to FIG. 6, there is illustrated an airbag inflator, generally designated by the reference numeral 610, in accordance with another alternative embodiment of the invention, and which inflator assembly also does not include an external diffuser member. Similar to the above-described embodiments, the airbag inflator 610 includes a pressure vessel 612 such as contains at least one gas source material, such as $N_2O$, for example, and an initiator device 616.

As with the above-described embodiments, the inflator 610 includes an elongated generally cylindrical unitary wall sleeve 622, having the form of an elongated cylindrical wall 623 with first and second axial ends, 624 and 626, respectively. The sleeve first end 624 is closed as the end 624 is joined in sealing relationship with an initiator device 616. The sleeve second end 626 is closed by means of a rounded end closure 650.

As with the above-described embodiments, the inflator unitary pressure vessel wall 622 includes at least one preformed pressure vessel opening feature 632, situated along the elongated cylindrical wall 623 of the sleeve 622, whereat the unitary pressure vessel wall 622 preferentially opens upon application of sufficient pressure thereagainst. The preformed pressure vessel opening feature 632, however, is an axially extending elongated thinned region formed in the cylindrical wall 623.

One method by which such a preformed pressure vessel opening feature can be formed is by heat treating the vessel wall 622 over a selected area, such as at a particular desired location. For example, such heat treatment can in practice take the form of annealing or tempering the unitary wall material at the selected location such as by the direct application of the thermal or other output of a flame torch or laser source onto the unitary wall material over the selected area.

It will be appreciated that operation of the inflator 610 will generally be similar to the operation of the subject inflators described above. More specifically, such as upon the sensing of a collision, an electrical signal is sent to the initiator device 616. The initiator device 616 functions and, when it is a pyrotechnic initiator, discharges high temperature combustion products into contact, thermal or otherwise, with the gas source material, e.g., $N_2O$, stored within the inflator 610. As described above, $N_2O$ begins to breakdown into smaller molecular fragments upon thermal dissociation thereof. As the $N_2O$ molecules fragment, the associated release of energy results in further heating of the remaining contents within the inflator chamber. Thus, as described above, the increase in either or both temperature and the relative amount of gaseous products within inflator assembly 610 continues such that when the gas pressure exceeds the structural capability of the axially extending elongated preformed pressure vessel opening feature 632, the preformed pressure vessel opening feature 632 ruptures or otherwise permits the passage of the inflation gas therethrough from the inflator assembly 610 and into the associated airbag cushion.

It will further be appreciated that certain inflatable restraint system installations may preferably rely on a reaction canister housing, used to house or store the system inflator device, to provide necessary or desired inflation gas diffusion. As a result, more uniform or standardized production of inflator devices may be realized, with desired inflation performance variability and inflation gas direction being provided or supplied through appropriate design modification of the reaction canister, rather than of the inflator device. For example, the above-described inflator assemblies 510 and 610 can, if desired, be utilized in an inflatable restraint system installation which relies on or utilizes the reaction canister housing, used to house or store the system inflator device, to provide necessary or desired inflation gas diffusion.

Figure 7:
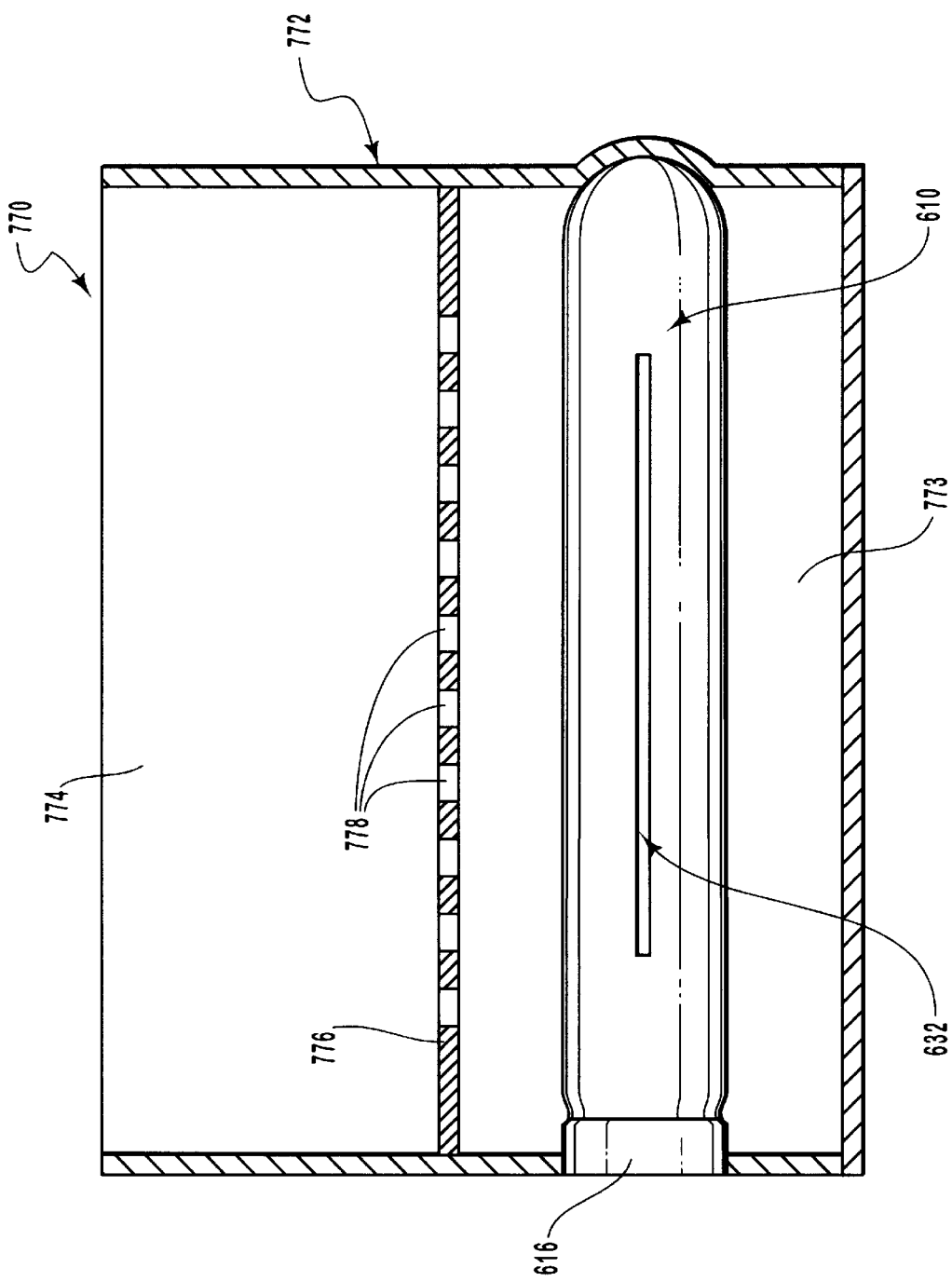
FIG. 7 is a simplified, partially in section, schematic drawing of an airbag module assembly incorporating the airbag inflator of FIG. 6.

FIG. 7 illustrates an airbag module assembly, generally designated by the reference numeral 770, incorporating the airbag inflator assembly 610, described above. In the airbag module assembly 770, the inflator assembly 610 is normally housed in a reaction canister or module housing 772. The reaction canister 772 includes a first storage volume 773 adapted to receive, house or contain the inflator assembly 610 (consequently, such storage volume is sometimes referred to as an inflator storage volume) and a second storage volume 774 adapted to receive, house or contain an associated airbag cushion (not shown, with such storage volume consequently sometimes referred to as a "cushion storage volume").

The airbag module assembly 770 includes a diffuser 776 which generally separates the inflator storage volume 773 from the cushion storage volume 774. The diffuser 776 includes a plurality of openings 778 therethrough which place the inflator storage volume 773 in fluid communication with the cushion storage volume 774 such that upon operation and release of inflation fluid from the inflator 610 such fluid can be passed and directed into the cushion storage volume 774 and, more specifically, into the associated airbag cushion stored or housed therein.

In operation, such as upon the sensing of a collision, an electrical signal is sent to the initiator device 616. The initiator device 616 functions to actuate the inflator assembly 610, resulting in an increase in pressure within the inflator assembly 610 with the preformed pressure vessel opening feature 632 rupturing or otherwise permitting the release or passage of inflation gas from the inflator assembly 610 when the force or pressure against the opening feature 632 reaches a preselected value. Released inflation gas will then pass through the diffuser openings 778 to the airbag cushion stored within the storage volume 774.

As will be appreciated, one or more of the size, shape, pattern or location of the diffuser openings can be appropriately selected such as to provide or result in desired inflation gas flow or direction into the associated airbag cushion.

Another aspect of the invention relates to a simplified or improved technique to fabricate an inflator apparatus such as described herein. A preferred method of fabricating a single chamber apparatus for inflating an inflatable device will now be described with particular reference to FIGS. 8 and 9. Specifically, a preferred method of fabricating an inflator apparatus, such as the inflator assembly 10, shown in FIG. 1 and described above, will be described.

Figure 8:
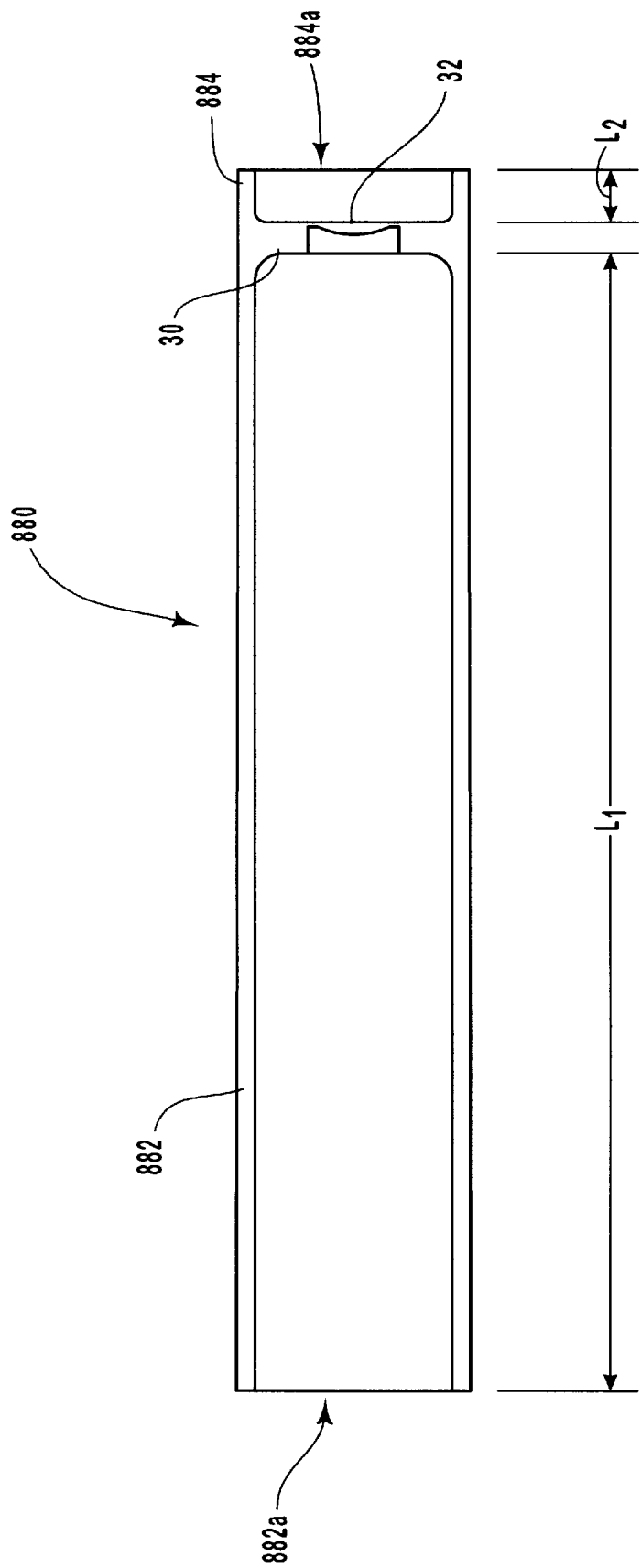
FIG. 8 is a simplified, sectional, schematic drawing of an intermediate part used in the fabrication of the airbag inflator of FIG. 1.

FIG. 8 shows an intermediate part, generally designated by the reference numeral 880. The intermediate part 880 includes the bulkhead 30 containing the at least one preformed pressure vessel opening feature 32. The intermediate part 880 also includes, oppositely disposed from the bulkhead 30, first and second tubular extensions 882 and 884, respectively, and each having an open axial end, 882a and 884a, respectively.

Such an intermediate part can produced or formed using various techniques. One particularly useful processing technique to produce such an intermediate part is by applying a dual impact forging process to a single solid slug of a parent material such as steel, for example.

Such as to simplify manufacture and production, it will generally be preferred that the tubular extensions 882 and 884, respectively, be formed to have the same general diameter as the bulkhead 30. The lengths of the tubular extensions 886a and 886b, respectively, can be appropriately selected to satisfy the particular requirements or needs of the application to which the particular extension is directed. For example, the first tubular extension 882 is sized and dimensioned for use in the formation of the pressure vessel 12, shown in FIG. 1. More specifically, the first tubular extension will desirably be of a length, designated L1, such as to provide a volume sufficient containing contents including a quantity of at least one gas source material which undergoes dissociation to form dissociation products including at least one gaseous dissociation product used to inflate the device. The second tubular extension 884 will desirably be of a length, designated L2, such as effective for use as the tubular extension 40 used to secure the diffuser member 20 in the inflator assembly 10, such as shown in FIG. 1.

Figure 9:
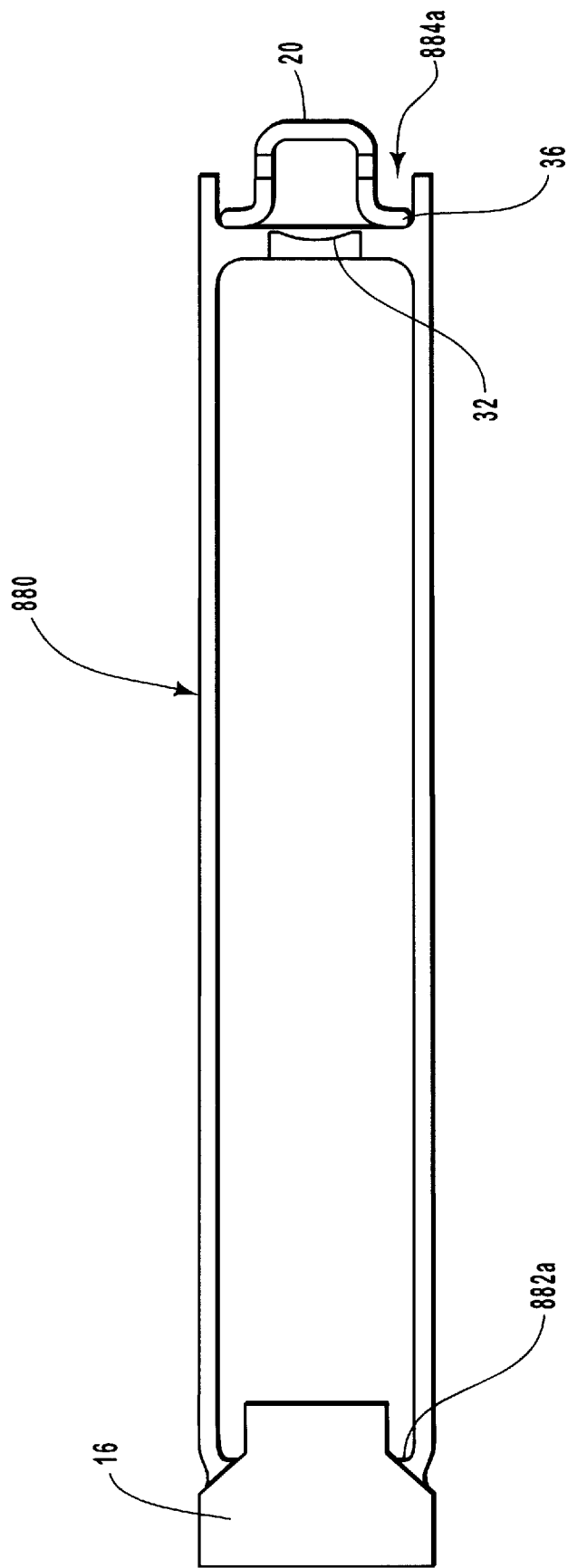
FIG. 9 is a simplified, partially in section, schematic drawing of a partially fabricated airbag inflator of FIG. 1 using the intermediate part of FIG. 8.

As shown in FIG. 9, the initiator device 16 is secured to the first tubular extension open end 882a such as by swagging the open end 882a about the initiator device 16, followed by welding the initiator device 16 to the tubular extension open end 822a. The diffuser member 20 is secured to the second tubular extension open end 884a such as by roll crimping the open end 884a about the diffuser flange edge portion 36 to effect joinder of the diffuser member to the part 880.

As will be appreciated, such a fabrication technique can provide various processing advantages such as permitting the direct attachment of a diffuser device to the inflator assembly without requiring the diffuser to be welded to the assembly. Thus avoiding a weld process which is generally considered an expensive processing technique in high volume production environments, such as associated with the mass production of motor vehicles.

While the fabrication technique has been described above with particular reference to the fabrication of the inflator assembly 10 shown in FIG. 1, it will be appreciated that such technique can, with appropriate modification, be used to fabricate or construct other such inflator assembly embodiments.

In view of the above, it will be appreciated that the invention can advantageously provide an inflator apparatus wherein the number or types of component parts and manufacturing process steps are either or both reduced or simplified to an extent not previously readily realized with prior inflator designs. Further, the invention can advantageously provide a pressurized inflator apparatus which reduces or minimizes the possible number of leak paths and thus can result in further improved reliability and simplified manufacture and production.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. An apparatus for inflating an inflatable device, said apparatus comprising:

a unitary pressure vessel wall which includes, at a selected location, at least one preformed pressure vessel opening feature whereat said unitary wall preferentially opens upon application of sufficient pressure thereagainst and wherein said unitary pressure vessel wall is formed from an intermediate part comprising a bulkhead containing the at least one preformed pressure vessel opening feature, said intermediate part also comprising first and second oppositely disposed tubular extensions of respective first and second lengths extending from the bulkhead with the first and second tubular extensions each having an open end, the first tubular extension forming a pressure vessel of the apparatus with the open end of the first tubular extension adapted to receive an initiator device and the open end of the second tubular extension adapted to receive a diffuser member.

2. The apparatus of claim 1 additionally comprising an initiator device, wherein the open end of the first tubular extension is swagged about said initiator device.

3. The apparatus of claim 1 additionally comprising a diffuser member, wherein the open end of the second tubular extension is roll crimped about said diffuser member.

4. The apparatus of claim 1 wherein the at least one preformed pressure vessel opening feature is bi-directional.

5. The apparatus of claim 1 wherein the at least one preformed pressure vessel opening feature comprises a cruciform formed in a thinned region of said unitary pressure vessel wall.

6. The apparatus of claim 1 wherein the gas source material comprises nitrous oxide.

7. A method of forming the apparatus of claim 1 wherein the at least one preformed pressure vessel opening feature is formed by heat treating said unitary pressure vessel wall over a selected area.

8. A side impact inflatable device inflator adapted to inflate a side impact inflatable airbag cushion, comprising:

a pressure chamber formed at least in part by an elongated, generally cylindrical unitary pressure vessel wall which includes, at a selected location, at least one preformed pressure vessel opening feature whereat the unitary pressure vessel wall preferentially opens upon application of sufficient pressure thereagainst, the unitary pressure vessel wall having an open axial end, said pressure chamber containing contents including a quantity of nitrous oxide which, upon actuation, undergoes dissociation to form dissociation products including at least one gaseous dissociation product used to inflate the side impact inflatable side impact inflatable airbag cushion and an initiator device fixed to the open axial end of the unitary pressure vessel wall and actuatable to be in dissociation initiating relationship with at least a portion of the quantity of nitrous oxide contained within said pressure chamber and wherein said unitary pressure vessel wall is formed from an intermediate part comprising a bulkhead containing the at least one preformed pressure vessel opening feature, said intermediate part also comprising first and second oppositely disposed tubular extensions of respective first and second lengths extending from the bulkhead with the first and second tubular extensions each having an open end, the first tubular extension forming a pressure vessel of the apparatus with the open end of the first tubular extension adapted to receive an initiator device and the open end of the second tubular extension adapted to receive a diffuser member.

9. The inflator of claim 8 wherein the open end of the first tubular extension is swagged about said initiator device.

10. The inflator of claim 8 additionally comprising a diffuser member, wherein the open end of the second tubular extension is roll crimped about said diffuser member.

11. The inflator of claim 8 wherein the at least one preformed pressure vessel opening feature is bi-directional.

12. The inflator of claim 8 wherein the at least one preformed pressure vessel opening feature comprises a cruciform formed in a thinned region of said unitary pressure vessel wall.

13. A method of forming the inflator of claim 8 wherein the at least one preformed pressure vessel opening feature is formed by heat treating said unitary pressure vessel wall over a selected area.

14. A method of fabricating a single chamber apparatus for inflating an inflatable device, said method comprising the steps of:

providing an intermediate part which includes a bulkhead containing at least one preformed pressure vessel opening feature, the part also including first and second oppositely disposed tubular extensions of respective first and second lengths extending from the bulkhead with the first and second tubular extensions each having an open end, securing an initiator device to the open end of the first tubular extension to form a closed pressure vessel chamber, the closed pressure vessel chamber containing contents including a quantity of at least one gas source material which undergoes dissociation to form dissociation products including at least one gaseous dissociation product used to inflate the device, and securing a diffuser member to the open end of the second tubular extension.

15. The method of claim 14 wherein said step of securing an initiator device to the open end of the first tubular extension comprises swagging the open end of the first tubular extension about the initiator device.

16. The method of claim 14 wherein said step of securing a diffuser member to the open end of the second tubular extension comprises roll crimping the open end of the second tubular extension about the diffuser device.

* * * * *